United States Patent [19]

Nomura et al.

[11] Patent Number: 4,590,355
[45] Date of Patent: May 20, 1986

[54] METHOD OF CONTROLLING MULTI-LAYER WELDING

[75] Inventors: Hirokazu Nomura; Yuji Sugitani; Naohiro Tamaoki, all of Tsu, Japan

[73] Assignee: Nippon Kokan Kabushiki Kaisha, Tokyo, Japan

[21] Appl. No.: 738,291

[22] Filed: May 28, 1985

[30] Foreign Application Priority Data

May 31, 1984 [JP] Japan ................ 59-109361

[51] Int. Cl.<sup>4</sup> ................................ B23K 9/12
[52] U.S. Cl. .................. 219/125.12; 219/124.22
[58] Field of Search ............. 219/125.12, 124.22, 219/124.1

[56] References Cited

U.S. PATENT DOCUMENTS 4,394,559  7/1983  Nomura et al. ............ 219/125.12
4,491,718  1/1985  Cook et al. ................. 219/125.12
4,508,953  4/1985  Murakami et al. ......... 219/125.12

FOREIGN PATENT DOCUMENTS 54-19445  2/1979  Japan.

Primary Examiner—Clifford C. Shaw
Attorney, Agent, or Firm—Fleit, Jacobson, Cohn & Price

[57] ABSTRACT

In the multi-layer welding of a joint of two pieces of metal to be welded by arc welding, the proper number of passes and the desired tracing positions of a welding torch for each layer are automatically established during the welding of the preceding layer. The welding torch is subjected to a Y-axis control so as to maintain constant the arc voltage or current during the welding and simultaneously the torch is caused to weave in the direction of an X-axis within the groove. The tracing of the groove by the torch is accomplished by controlling the weaving turning positions of the torch in accordance with the X-axis and Y-axis direction displacement data of the torch and the torch displacements in the X-axis direction are compared with a predetermined value thereby determining the proper number of passes to be made in the welding of the next layer.

3 Claims, 12 Drawing Figures

METHOD OF CONTROLLING MULTI-LAYER WELDING

BACKGROUND OF THE INVENTION

The present invention relates to a method of controlling multi-layer welding operations in which a joint to be welded is subjected to multi-layer welding by an arc welding process employing a consumable electrode or a nonconsumable electrode with a filler wire.

It has been known in the past that when relatively thick metal plates are to be welded by butt welding, welding techniques, i.e., a multi-layer welding process is used in which a plurality of welding passes are repeated on a joint to be welded and the weld beads resulting from the respective passes are deposited one after another in a number of layers within the groove to be welded. In this case, if the joint has a bevel angle, as the deposition of layers proceeds, the groove which for the following layer is increased and the number of passes for the following layer must be increased correspondingly. The reason is that the maximum bead width which can be applied by a single pass is limited from the standpoint of ensuring the desired welded joint performance and preventing the occurrence of welded defects.

In the past, it has been the usual practice such that the proper number of passes for each layer is preset by the welder who measures the groove width of this layer visually or by means of any instrument and determines the proper number of passes prior to the welding of the layer and then the welding is performed by determining the tracing positions of the welding torch for each pass. Therefore, as far as such a method has been used, it is possible to realize an unattended automatic multi-layer welding and increase the welding efficiency.

SUMMARY OF THE INVENTION

It is the primary object of the present invention to provide a multi-layer welding control method so designed that when a joint to be welded is subjected to multilayer welding by an arc welding process employing a consumable electrode or a nonconsumable electrode together with a filler wire, during the welding of each layer the proper number of passes for the following layer and the tracing positions of the welding torch for each of the passes are automatically established thereby automatically and continuously performing the multi-layer welding without interrupting the welding for every pass or layer.

The present invention adaptationally utilizes the invention already proposed in Japanese Patent Publication No. 57-3462, that is, "a method for controlling a welding torch to trace a groove" which utilizes the welding arc itself as a groove detecting sensor.

In other words, an arc welding method according to the present invention is designed so that using a dc or ac power source having a constant current characteristic or constant voltage characteristic as a welding power source, the arc voltage of an arc produced at a consumable electrode or a nonconsumable electrode used jointly with a filler wire or a welding current is detected and the position of the electrode forward end is controlled by a mechanism for driving the welding electrode in its axial direction (hereinafter referred to as a Y axis) such that the detected value is always made equal to a predetermined reference value thereby maintaining the arc length constant. At the same time, the electrode is caused to weave or more back and forth in the groove width direction (hereinafter referred to as an X axis). In this case, in accordance with the invention, firstly during the welding of the first layer in the groove the electrode is reversed in the X-axis direction at each extreme end of the weaving on condition that the Y-axis direction displacement $e_y$ of the electrode has attained a predetermined reference height position $e_o$ and this operation is repeated thus causing the arc at the electrode end to accurately trace the groove while causing the arc to move waveringly from side to side in the width direction within the groove. Here, assuming that an interval of time for one weaving from one end to the other is referred to as a cycle of the weaving, the X-axis direction width of the weaving or a weaving width Ww, a weaving center position Wc and a position in the direction of welding in each cycle are stored from moment to moment and this storage operation is performed continuously from the starting end to the terminating end of the joint to be welded.

When the welding reaches the terminating end, the values of the weaving widths Ww stored during the respective weaving cycles are compared with a predetermined weaving width limiting value $W_{MAX}$ and the number N of those showing $W_W > W_{MAX}$ is counted. This number N is compared with a product $\alpha n$ of a separately predetermined ratio $\alpha (\alpha < 1)$ and the total number n of the weaving cycles so that when there is a condition $N > \alpha n$, it is determined that the second layer is to be welded by a two-pass layer method. If $N \leq \alpha n$, then it is determined that the second layer is to be welded by the one-pass layer method.

Then, where the welding is to be performed by the two-pass layer method, one extreme end of the weaving movement (e.g., the left end with respect to the direction of welding) becomes the weaving center position Wc stored during the welding of the first layer. The other end or the right end is determined on condition that the Y-axis direction displacement $e_y$ of the electrode attains a predetermined value. Here, the term predetermined value corresponds to a value representing the sum of a reference height position $e_o$ predetermined for determining the two end positions of the weaving for the first layer welding and the height of the bead or beads built up to the present layer. This weaving operation is repeated as the welding proceeds in the direction of the weld line so that during the pass on one side the arc at the electrode forward end is always caused to accurately trace the groove with the left end of the weaving being set to the center of the groove and the right end being set to the right side of the groove irrespective of any deviation of the groove line and any variation of the groove width.

During the pass on the other side, conversely the right end of the weaving becomes the weaving center position Wc and the left end becomes a position where the Y-axis displacement $e_y$ attains the above-mentioned predetermined value thereby performing the similar tracing control. In this case, the weaving width is successively stored during the successive weaving cycles so that when the two-pass layer welding is completed, as in the case of the first layer welding, the number N of those of the stored weaving widths exceeding the limiting value $W_w$ is counted and the number of passes for the next layer is determined by comparing the values of N and $\alpha n$ in the same manner as mentioned previously.

As described so far, in accordance with the invention the welding arc is utilized as a detecting sensor so as to grasp the condition of the groove and thereby to determine the number of passes and the tracing positions of the welding torch for each layer and therefore there is a great effect that the desired multi-layer welding is performed automatically and continuously without interrupting the welding for every pass or layer.

The above and other objects as well as advantageous features of the invention will become more clear from the following description taken in conjunction with the drawings.

DESCRIPTION OF THE PREFERRED EMBODIMENTS

The present invention will now be described with reference to the illustrated embodiments.

Figure 1:
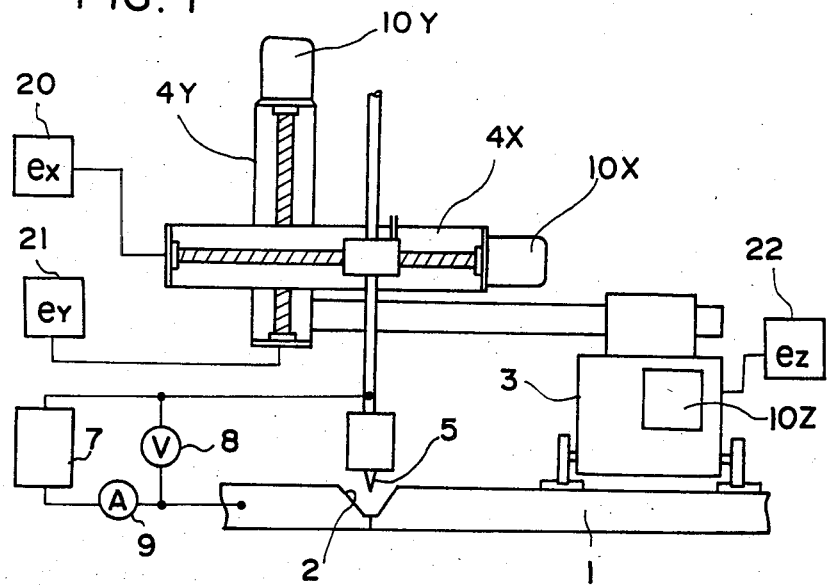
FIG. 1 is a schematic diagram showing the principal component parts of a welding apparatus for performing a control method according to the invention.

FIG. 1 schematically illustrates the principal component parts of a welding apparatus for performing a control method according to the invention. A welding traveller 3 is movable along a groove 2 of base metals 1 to be welded, and a welding electrode 5 is supported on the welding traveller 3 by means of vertical direction (Y axis) and groove width direction (X axis) driving mechanisms 4Y and 4X so that the electrode 5 is moved along the groove line while oscillating it in the width direction within the groove and simultaneously its vertical movement in the Y-axis direction is controlled so as to maintain the arc length constant. In this case, detectors 20, 21 and 22 respectivey detect an X-axis direction weaving displacement $e_x$, Y-axis direction displacement $e_y$ and traveller direction (Z axis) displacement $e_z$ of the electrode 5. The welding electrode 5 may be either a consumable electrode or a nonconsumable electrode and a welding power source 7 is connected across the electrode 5 and the base metals 1 to be welded. The power source 7 comprises either a dc or ac power source having a constant voltage characteristic or a constant current characteristic depending on the welding application. Numeral 8 designates an arc voltage detector, and 9 welding current detector. Depending on the characteristic of the welding power source, the detected value of either one of the detectors 8 and 9 is utilized for the previously mentioned Y-axis direction arc length control.

The basic concept of this invention resides in that while moving the electrode 5 in the Y-axis direction such that the arc voltage of the arc produced by the electrode or the welding current (the output of the detector 8 or 9) is always maintained constant, the electrode 5 is caused to weave in the width direction (X axis) within the groove so that in accordance with the resulting X-axis and Y-axis direction displacements $e_x$ and $e_y$ of the electrode 5, the X-axis reversing positions of the weaving are controlled to effect accurate tracing welding and also the magnitudes of the then detected X-axis displacements $e_x$ are discriminated to automatically determined the proper number of passes for the welding of the next layer. It is to be noted that the X-axis, Y-axis and Z-axis movements of the electrode 5 are respectively effected by motors 10X, 10Y and 10Z.

Figure 2:
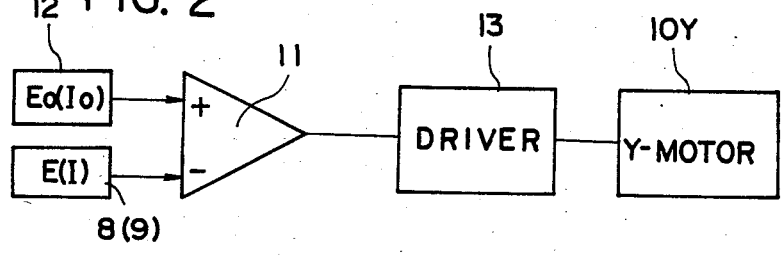
FIG. 2 is a block diagram of a control circuit for the Y-motor.
Figure 3:
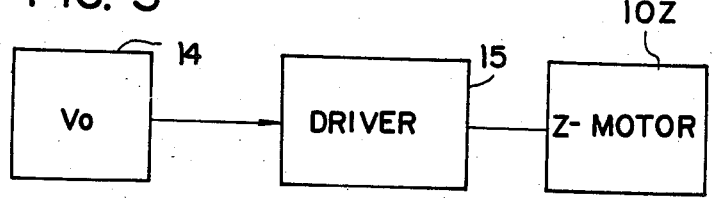
FIG. 3 is a block diagram of a drive circuit for the welding traveller motor.
Figure 4:
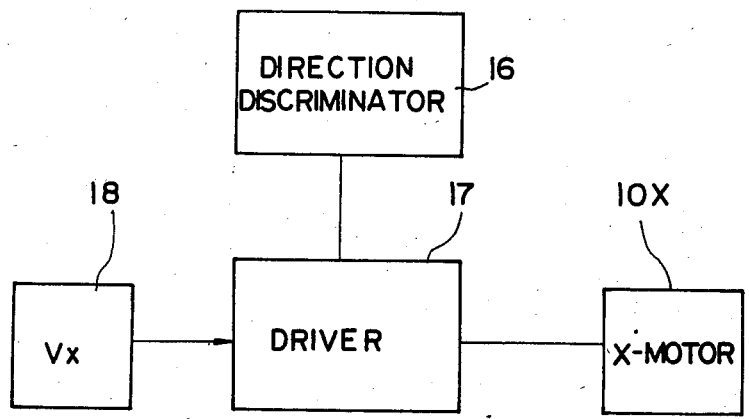
FIG. 4 is a block diagram of a drive circuit for the X-motor.

FIGS. 2 to 4 respectively show block diagrams of motor control circuits for the movements in the directions of these axes. In FIG. 2 showing the control circuit of the Y-motor 10Y, depending on whether the power source 7 is a constant current source or a constant voltage source, a differential amplifier 11 is supplied with the arc voltage detected by the detector 8 or the welding current detected by the detector 9. The following description is made of the case in which the welding current is supplied. The supplied welding current I is compared with a preset current vlaue $I_o$ supplied from setting means 12 and then the Y-motor 10Y is operated by a motor driver 13 so as to attain a speed proportional to the difference between the two inputs. This circuit maintains the welding current at the constant value Io and therefore the arc length or the distance (extension) between the electrode chip forward end and the base metal surface just below the arc is controlled at a constant value.

FIG. 3 shows the drive circuit of the welding traveller motor 10Z in which a speed preset value Vo supplied from setting means 14 is supplied to a driver 15 thus operating the motor 10Z.

Figure 5:
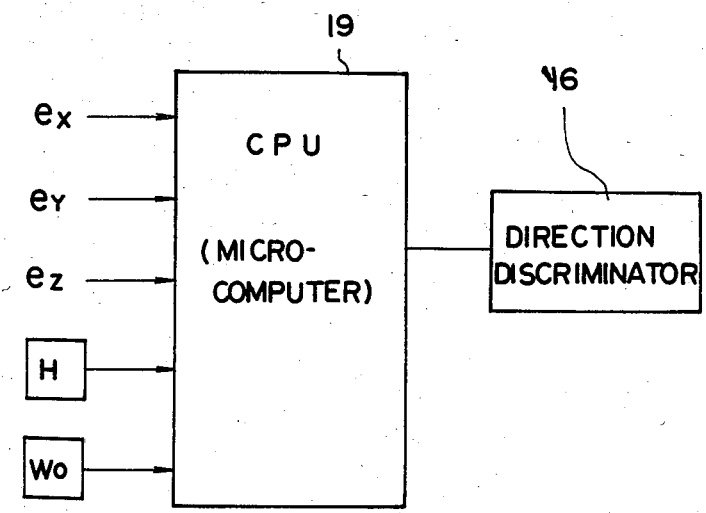
FIG. 5 is a block diagram of a control circuit for commanding reversing of the direction of weaving.

FIG. 4 shows the drive circuit of the X-motor 10X in which a weaving speed preset value $V_x$ supplied from setting means 18 is supplied to a driver 17 thus operating the motor 10X and the desired weaving reversing positions are controlled by a direction discriminator 16. The direction discriminator 16 serves the function of switching the direction of rotation of the motor 10X and its operation is performed in accordance with the commands applied from a central controller CPU or microcomputer 19 shown in FIG. 5. FIG. 5 shows a control circuit for commanding the reversing of direction of the weaving and the microcomputer 19 receives as its inputs the X-axis, Y-axis and Z-axis direction displacements $e_x$, $e_y$ and $e_z$, a Y-axis direction reversing height preset value H and a constant weaving width reference value Wo. In accordance with these input data, the microcomputer 19 determines positions for reversing the direction of rotation of the X-motor 10X and applies reversing command signals to the direction discriminator 16. The control operation of FIG. 5 will now be described in greater detail.

Figure 6:
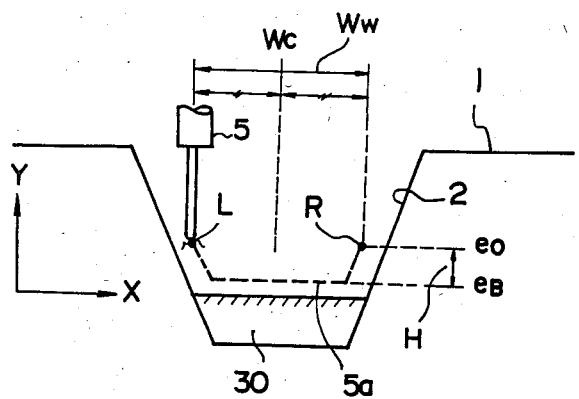
FIG. 6 is a diagram showing the manner in which the welding of a first layer is effected by a one-pass layer method.

FIG. 6 shows a case in which the welding of the first layer in the groove is made with a single pass. In the Figure, a thick broken line 5a indicates the path of the electrode forward end described during one cycle of the weaving. In this case, the weaving reversing positions in the X-axis direction are indicated by points L and R in the Figure and their Y-axis direction positions are so controlled that they are maintained at a constant height or vertical position $e_o$ at each of the travel direction or Z-axis positions $e_z$ of the traveller 3. In other words, that value attained by the Y-axis displacement $e_y$ of the electrode 5 when it is near the center of the groove during the movement of the electrode 5 in the X-axis direction, that is, a minimum value $e_B$ of the displacement $e_y$ is stored temporarily so that when the electrode 5 reaches each slope of the groove thus increasing the displacement $e_y$ by an amount corresponding to the predetermined Y-axis direction reversing height H, that is, when the value of $e_y$ becomes equal to the sum $e_B+H$ of the values of $e_B$ and H, the direction of X-axis movement of the electrode 5 is reversed. Therefore, the resulting weaving reversing position $e_o$ is equal to the value of $e_B+H$.

Instead of establishing the reversing positions $e_o$ by this control method for every weaving cycle, during the beginning of the welding of each layer, that is, during the first weaving cycle, the value of $e_B+H$ obtained by the above-mentioned control method is stored so that this value is used as the value of $e_o$ (=$e_B+H$) and it is thereafter used as each reversing position in the welding of this layer.

This control operation is performed continuously along with the movement of the welding traveller 3 and thus the desired accurate groove tracing welding is accomplished. In this case, the weaving widths Ww, weaving center position Wc and Z-axis positions obtained during the respective weaving cycles from the starting end to the terminating end in the welding of the joint for this layer are successively stored in the microcomputer 19. When the welding of this layer is completed so that the terminating end is reached, of the number n of all the weaving widths stored the number N of those exceeding the predetermined limiting weaving width $M_{MAX}$ is counted by the microcomputer 19 so as to determine whether the number N is greater than a predetermined ratio $\alpha (\alpha < 1)$ with respect to the total number n.

If $N < \alpha n$, the following or second layer is welded with a single pass and the same control method as the welding of the first layer is repeated.

If $N > \alpha n$, it is determined that the second layer be deposited with two passes. The condition $N > \alpha n$ indicates that of the number n of all the weaving cycles made during the welding of this layer the greater part is in excess of the limiting weaving width $W_{MAX}$. In other words, it is evident that the weaving width will be increased if the second layer is to be deposited with a single pass and therefore the number of passes must be increased by one.

Figure 7A:
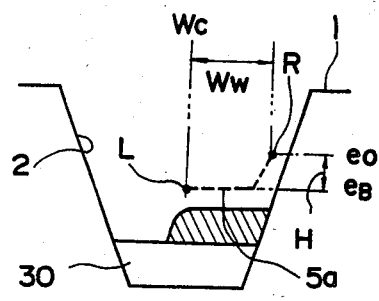
FIGS. 7a and 7b are diagrams for explaining the manner in which the welding of the next layer is effected by a two-pass layer method in accordance with the invention.
Figure 7B:
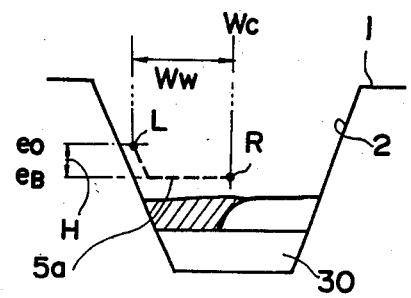

FIGS. 7a and 7b show a case where the deposition of the second layer is made with two passes. FIG. 7a shows the condition of the layer during the first pass and FIG. 7b shows the condition of the layer during the second pass. In the Figures, as in the case of FIG. 6, a thick broken line 5a indicates the weaving path of the forward end of the electrode 5 during one cycle of the weaving and the resulting weld bead is shown by the shaded portion. In this case, the desired weaving reversing positions L and R are established by setting one end to the point of a Y-axis position $e_o$ and setting the other end to the point of one of the weaving center positions Wc which were stored along with the Z-axis positions during the welding of the first layer or the center position of the groove. In other words, if, for example, the welding is first started from the starting end of the joint in FIG. 7a, the X-axis position of the electrode forward end is set to the point L by reading the center position Wc stored during the welding of the first layer and then the electrode is moved toward the point R. When the electrode reaches the R-side slope of the groove so that the electrode is raised in the Y-axis direction and the resulting displacement becomes equal to the value of $e_o$, the X-axis movement is reversed. The value of $e_B$ is established in the same manner as in the welding of the first layer. In other words, the value of $e_y$ obtained when the electrode is at the point L is temporarily stored as the value of $e_B$ and it is combined with the preset value H during the first weaving cycle. The resulting value $e_o$ (=$e_B+H$) is stored and it is used as the groove slope-side reversing position in the welding of the second layer. After this control operation has been successively repeated from the starting end to the terminal end of the joint to be welded, the welding pass on the other side or the welding pass of FIG. 7b is performed. In this case, the left and right reversing method of the weaving is reversed as compared with that of FIG. 7a so that the left reversing position is set to the point $e_o$ and the right reversing position is set to the weaving center position Wc stored during the welding of the first layer thereby performing the welding. This control operation accomplishes the two-pass layer welding. During the two welding passes, the weaving widthes Ww in the respective weaving cycles are stored so that when the welding of the second layer is completed, the number N of those weaving widths exceeding the limiting weaving width $W_{MAX}$ is compared in magnitude with a value $\alpha n$. If $N > \alpha n$, it is automatically determined that the welding of the third layer be effected with three passes.

Figures 8A, 8B, 8C:
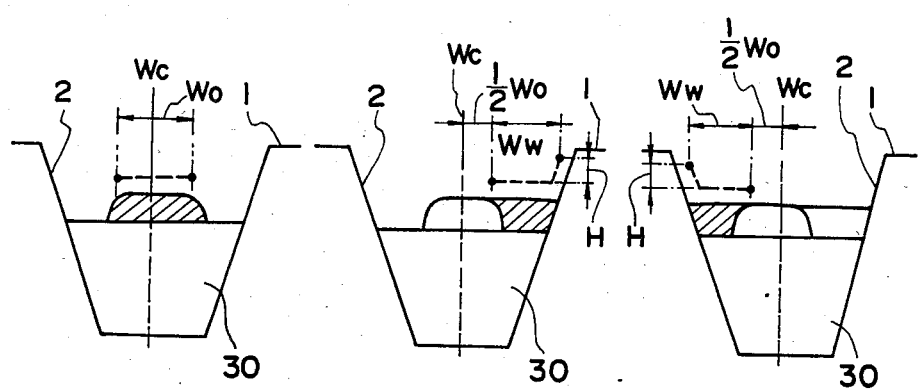
FIGS. 8a, 8b and 8c are diagrams for explaining the manner in which the welding of the next layer is effected by a three-pass layer method in accordance with the invention.

FIGS. 8a, 8b and 8c show an example of the pass sequence and weaving control method according to a two-pass layer method. The indication method of the Figures is the same as in FIG. 6 and FIGS. 7a and 7b. The pass sequence is for example selected so that the passes are made in the order of FIGS. 8a, 8b and 8c. FIG. 8a shows the welding in the central portion of the groove which is performed by using the weaving center position Wc stored during the welding of the first layer as the weaving center of this pass and setting its weaving width to a predetermined constant width $W_o$. However, it is of course selected $W_o < W_{MAX}$. FIGS. 8b and 8c show respectively the welding on the left and right sides of the groove and their left and right reversing positions of the weaving are such that one is the point $e_o$ obtained by the same control method as mentioned previously and the other is one or the other of the left and right weaving ends in the welding of FIG. 8a, that is, $Wc + \frac{1}{2} Wo$ or $Wc - \frac{1}{2} Wo$.

While the above-described embodiment has shown the welding of layers made with one to three passes, it is needless to say that in accordance with the method of this invention the same control can be effected in the welding of layers with greater numbers of passes such as four passes, five passes and six passes.

Figure 9:
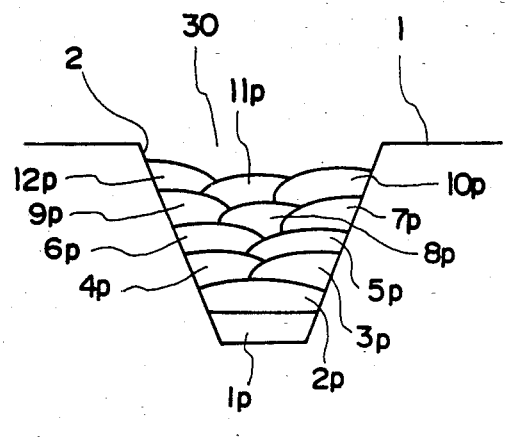
FIG. 9 is a diagram for explaining the manner in which beads are built up by the multi-layer welding.

FIG. 9 shows an example of multi-layer weld beads. Designated at numerals $1p, 2p, 3p \ldots, 12p$ are the beads deposited by the respective passes. In the Figure, the first and second layers are each deposited with a single pass and the third and fourth layers are each deposited with two passes. The fifth and sixth layers are each deposited with three passes.

What is claimed is:

1. In a method for effecting a multi-layer welding of a groove of two pieces of metal by an arc welding process performed by weaving a welding electrode in a width direction (X axis) within the groove, said arc welding process performing a control operation such that a position of a forward end of the welding electrode is varied by driving means for moving the electrode in an axial direction (Y axis) thereof thus maintaining constant a predetermined welding current or arc voltage and thereby maintaining an arc length constant, a multi-layer welding control method comprising the steps of:

depositing a first layer by a one-pass layer welding by reversing the weaving of said electrode in said X-axis direction on condition that said electrode is raised by an amount equal to a predetermined value ($e_o$) when said electrode arrives at each of two slopes of said groove;

simultaneously detecting and storing successively a weaving width (Ww), a weaving center position (Wc) and a position ($e_z$) of said electrode in the direction of a line of a joint to be welded in each of all weaving cycles of said electrode made for said first layer from a starting end to a terminating end of said joint; and comparing in magnitude a number N of said weaving widths included in a total number n of said stored weaving widths and exceeding a predetermined limiting weaving width ($W_{MAX}$) and a product $\alpha n$ of a predetermined ratio $\alpha(\alpha<1)$ and said total number n when the welding of said first layer reaches said terminating end, whereby if $N \leq \alpha n$, it is determined that a second layer is also to be deposited by said one-pass layer welding thereby repeating the welding according to said control, whereas if $N > \alpha n$, it is determined that said second layer is to be deposited by a two-pass layer welding thereby depositing said second layer with two passes.

2. A control method according to claim 1, further comprising the steps of:

depositing said second layer by said two-pass layer welding by reversing the weaving of said electrode in said X-axis direction at one extreme on condition that said electrode is raised by an amount equal to said predetermined value ($e_o$) when said electrode arrives at one or the other of the slopes of said groove and at the other extreme on condition that a position ($e_x$) of said electrode in said X-axis direction coincides with one of said weaving center positions (Wc) stored during the welding of said first layer and reproduced in correspondence with a position ($e_z$) of said electrode in said joint line direction;

simultaneously detecting and storing successively a weaving width (Ww) in each of all weaving cycles made in the range from the starting end to the terminating end of said joint during each of the passes of said second layer; and comparing in magnitude a number N of said weaving widths included in a total number N of said stored weaving widths and exceeding said predetermined limiting weaving width ($W_{MAX}$) and a product on of said predetermined ratio $\alpha(\alpha<1)$ and said total number n when the welding of said second layer is completed, whereby if $N \leq \alpha n$, it is determined that a third layer is also to be deposited by said two-pass layer welding thereby repeating the welding according to said control, whereas if $N > \alpha n$, it is determined that said third layer is to be deposited by a three-pass layer welding thereby depositing said third layer with three passes.

3. A control method according to claim 2, further comprising the steps of:

depositing said third layer by a multi-pass layer welding involving at least three passes such that one of said three passes positioned centrally with respect to the slopes (walls) of said groove is performed by weaving said electrode with a predetermined weaving width ($W_o$) smaller than said predetermined limiting weaving width ($W_{MAX}$) on the basis of said weaving center positions Wc stored during the welding of said first layer and each reproduced in correspondence with one of positions ($e_z$) of said electrode in the direction said joint line and that each of the other passes on the side of the slopes of said groove is performed by reversing the weaving of said electrode in said X-axis direction at one extreme on condition that said electrode is raised by an amount equal to said predetermined constant value ($e_o$) when said electrode arrives at one or the other of said groove slopes and at the other extreme on condition that an X-axis position of said electrode coincides with an X-axis position of one of this-side weaving extremes of said adjacent groove center-side pass preliminarily stored in each of the weaving cycles thereof and reproduced in correspondence with one of positions of said electrode in the direction of said joint line;

simultaneously detecting and storing successively a weaving width (Ww) in each of all weaving cycles made during said groove slope-side passes; and comparing in magnitude a number N of said weaving widths included in a total number n of said stored weaving widths and exceeding said predetermined limiting weaving width ($W_{MAX}$) and a product $\alpha n$-($\alpha<1$) of said predetermined ratio $\alpha$ and said total number n, whereby if $N \leq \alpha n$, a fourth layer is deposited with the same number of passes as previously by repeating the welding according to said control, whereas if $N > \alpha n$, said fourth layer is deposited with passes numbering one greater than previously by the welding according to said control.

* * * * *